(12) United States Patent
Martinez et al.

(10) Patent No.: US 11,801,616 B2
(45) Date of Patent: Oct. 31, 2023

(54) MONITORING SYSTEM FOR THREE-DIMENSIONAL PRINTING

(71) Applicant: Caterpillar Inc., Peoria, IL (US)

(72) Inventors: Daniel Martinez, Peoria, IL (US); Daniel Peter Sergison, East Peoria, IL (US); Zhijun Cai, Dunlap, IL (US); Jean-Jacques Clar, Edelstein, IL (US); Eric Alan Reiners, Washington, IL (US); Benjamin John Hodel, Dunlap, IL (US); Benjamin L. Naasz, Mackinaw, IL (US)

(73) Assignee: Caterpillar Inc., Peoria, IL (US)

( * ) Notice: Subject to any disclaimer, the term of this patent is extended or adjusted under 35 U.S.C. 154(b) by 204 days.

(21) Appl. No.: 16/951,724

(22) Filed: Nov. 18, 2020

(65) Prior Publication Data

US 2021/0069932 A1     Mar. 11, 2021

Related U.S. Application Data

(63) Continuation of application No. 15/730,071, filed on Oct. 11, 2017, now Pat. No. 10,870,219.

(51) Int. Cl.
*B28B 17/00* (2006.01)
*B33Y 50/02* (2015.01)
(Continued)

(52) U.S. Cl.
CPC .......... *B28B 17/0081* (2013.01); *B01F 35/00* (2022.01); *B28C 7/024* (2013.01);
(Continued)

(58) Field of Classification Search
CPC .... B29C 7/02; B28B 17/0081; B28B 17/0072
See application file for complete search history.

(56) References Cited

U.S. PATENT DOCUMENTS 5,320,425 A * 6/1994 Stephenson ............... B28C 7/02
700/265
5,752,768 A * 5/1998 Assh ....................... B28C 5/422
366/60

(Continued)

FOREIGN PATENT DOCUMENTS

CN    101278245 A    10/2008
CN    203293373    11/2013
(Continued)

OTHER PUBLICATIONS

Machine translation CN104139180A (Year: 2014).*
(Continued)

*Primary Examiner* — Matthew J Daniels
*Assistant Examiner* — Wayne K. Swier

(57) ABSTRACT

An inference system for monitoring a cementitious mixture for three-dimensional printing is provided. The inference system includes an ambient condition sensor, a temperature sensor, a moisture sensor and an image capturing device. The inference system also includes a controller coupled to the ambient condition sensor, the temperature sensor, the moisture sensor, and the image capturing device. The controller receives sensed ambient conditions, a temperature signal, and a moisture content signal. The controller receives an image feed of a portion of a cementitious mixture. The controller also receives signals indicative of a motor speed and a motor torque associated with a mixing container. The controller builds a model and determines a material suitability of the cementitious mixture using the model based on the received ambient conditions, the temperature signal, the moisture content signal, the image feed, the motor speed, and the motor torque and determines one or more corrective actions.

18 Claims, 4 Drawing Sheets

(51) Int. Cl.
*B33Y 30/00* (2015.01)
*B28C 7/02* (2006.01)
*B33Y 70/00* (2020.01)
*B01F 35/00* (2022.01)
*B28B 1/00* (2006.01)
*E04B 1/16* (2006.01)

(52) U.S. Cl.
CPC .............. *B28C 7/026* (2013.01); *B33Y 30/00* (2014.12); *B33Y 50/02* (2014.12); *B33Y 70/00* (2014.12); *B28B 1/001* (2013.01); *E04B 1/161* (2013.01); *E04B 2103/02* (2013.01)

(56) References Cited

U.S. PATENT DOCUMENTS

| | | | |
|---|---|---|---|
| 8,858,061 B2 | 10/2014 | Berman | |
| 9,625,891 B2 | 4/2017 | Berman | |
| 2005/0174879 A1* | 8/2005 | Bentley | ............... B28C 7/12 366/16 |
| 2011/0077778 A1 | 3/2011 | Berman | |
| 2013/0053995 A1 | 2/2013 | Hashimoto et al. | |
| 2013/0272084 A1* | 10/2013 | Koehler | ............... B29C 70/882 366/12 |
| 2014/0252668 A1 | 9/2014 | Austin et al. | |
| 2015/0051737 A1 | 2/2015 | Berman | |
| 2015/0355160 A1 | 12/2015 | Berman | |
| 2016/0258256 A1 | 9/2016 | Nguyen et al. | |
| 2017/0016244 A1 | 1/2017 | Keller | |
| 2017/0016874 A1* | 1/2017 | Radjy | ................ B28C 7/024 |
| 2017/0341183 A1 | 11/2017 | Buller et al. | |
| 2018/0250744 A1 | 9/2018 | Symeonidis et al. | |

FOREIGN PATENT DOCUMENTS

| | | | | |
|---|---|---|---|---|
| CN | 104023925 A | | 9/2014 | |
| CN | 104139180 A | * | 11/2014 | ............. A01K 47/06 |
| CN | 104197994 | | 12/2014 | |
| CN | 104679451 A | | 6/2015 | |
| CN | 103967276 B | | 3/2016 | |
| CN | 106113276 A | * | 11/2016 | ........ B01F 15/00857 |
| CN | 106363770 A | | 2/2017 | |
| CN | 104943176 B | | 4/2017 | |
| CN | 106994746 | | 8/2017 | |
| CN | 106053168 B | | 10/2017 | |
| CN | 106536851 B | | 6/2020 | |
| CN | 106437152 B | | 12/2020 | |
| WO | WO2006138732 | | 12/2006 | |
| WO | WO-2014121405 A1 | * | 8/2014 | ........ B01F 15/00857 |
| WO | WO-2017075285 A1 | * | 5/2017 | ............. B22F 10/20 |

OTHER PUBLICATIONS

Machine translation WO2014121405A1 (Year: 2014).*
Machine translation CN106113276A (Year: 2016).*
Office action for U.S. Appl. No. 15/730,071, dated May 5, 2020, Martinez, "Monitoring System for Three-Dimensional Printing", 17 pages.
Chinese Search Report for Int'l. Patent Appln. No. 2018800641435, (4 pgs), Pub. Year—2018.

* cited by examiner

MONITORING SYSTEM FOR THREE-DIMENSIONAL PRINTING

CROSS-REFERENCE TO RELATED APPLICATIONS

This application claims priority to and is a continuation of U.S. patent application Ser. No. 15/730,071, filed Oct. 11, 2017, entitled "Monitoring System For Three-Dimensional Printing," the disclosure of which is incorporated by reference herein in its entirety for all purposes.

TECHNICAL FIELD

The present disclosure relates to a monitoring system, and more specifically, to a system and method for monitoring a cementitious mixture for three-dimensional printing.

BACKGROUND

Additive construction applies three-dimensional printing technology at a large scale, depositing construction material layer upon layer, to construct suitable buildings and structures in a faster and less labor-intensive way. Before and during the construction printing process, a cementitious mixture needs to be prepared. The cementitious mixture used in such applications has a very high and constrained standard compared to that of any other regular cementitious mix due to the specificity of the application.

For example, viscosity of the cementitious mixture is one such parameter. The material properties of the cementitious mixture for three-dimensional printing cannot be too dry to flow and cannot be too wet to keep the shape or sustain the next layer. There may be other material properties that may need to be met as well. Besides that, the cementitious mixture may be highly influenced by the environment, such as ambient temperature, moisture, and the quality of raw mixing materials. However, a pre-determined ratio of specific components may not always result in the formation of the ideal cementitious mixture.

Knowledgeable personnel may be required to be present during the mixing procedure to check the quality of the cementitious mixture. Sometimes, the personnel may need to add some components, such as sand or water, to improve the material properties of the cementitious mixture. This may be a laborious and time-consuming process which is susceptible to human errors. Further, the mixing procedure may rely on knowledge, domain expertise, and intuitiveness of the personnel, making it challenging for novice personnel to accurately perform such tasks.

United States Published Application Number 2014/0252668 describes an apparatus for performing a multi-layer construction method using cementitious material. The apparatus has a reservoir for containing cementitious material. The reservoir is coupled to a print head with a delivery nozzle. The delivery nozzle can be moved by a robotic arm assembly to index the nozzle along a predetermined path. Flow of the cementitious material from the reservoir to the nozzle and to extrude the material out of the nozzle is controlled in conjunction with indexing of the nozzle. A support material, an accelerating agent and a cartilage material may also be deposited from the print head.

SUMMARY OF THE DISCLOSURE

In one aspect of the present disclosure, an inference system for monitoring a cementitious mixture for three-dimensional printing is provided. The inference system includes an ambient condition sensor configured to sense ambient conditions associated with a mixing container. The inference system includes a temperature sensor configured to generate a temperature signal of the cementitious mixture. The inference system includes a moisture sensor configured to generate a moisture content signal associated with the cementitious mixture. The inference system includes an image capturing device configured to generate an image feed of at least a portion of the cementitious mixture within the mixing container. The inference system includes a controller coupled to the ambient condition sensor, the temperature sensor, the moisture sensor, and the image capturing device. The controller is configured to receive the sensed ambient conditions. The controller is configured to receive the temperature signal. The controller is configured to receive the moisture content signal. The controller is configured to receive the image feed of the portion of the cementitious mixture. The controller is configured to receive signals indicative of a motor speed and a motor torque associated with the mixing container. The controller is configured to build a model and determine a material suitability of the cementitious mixture using the model based on the received ambient conditions, the temperature signal, the moisture content signal, the image feed, the motor speed, and the motor torque. The controller is configured to determine one or more corrective actions based on the determined material suitability.

In another aspect of the present disclosure, a method for monitoring a cementitious mixture for three-dimensional printing is provided. The method includes receiving, by a controller, sensed ambient conditions associated with a mixing container from an ambient condition sensor. The method includes receiving, by the controller, a temperature signal of the cementitious mixture from a temperature sensor. The method includes receiving, by the controller, a moisture content signal associated with the cementitious mixture from a moisture sensor. The method includes receiving, by the controller, an image feed of at least a portion of the cementitious mixture within the mixing container from an image capturing device. The method includes receiving, by the controller, signals indicative of a motor speed and a motor torque associated with the mixing container. The method includes building a model and determining, by the controller, a material suitability of the cementitious mixture using the model based on the received ambient conditions, the temperature signal, the moisture content signal, the image feed, the motor speed, and the motor torque. The method includes determining, by the controller, one or more corrective actions based on the determined material suitability.

In yet another aspect of the present disclosure, a printing assembly for three-dimensional printing using a cementitious mixture is provided. The printing assembly includes a pump, a mixing container coupled to the pump, and an inference system for the mixing container. The inference system includes an ambient condition sensor configured to sense ambient conditions associated with a mixing container. The inference system includes a temperature sensor configured to generate a temperature signal of the cementitious mixture. The inference system includes a moisture sensor configured to generate a moisture content signal associated with the cementitious mixture. The inference system includes an image capturing device configured to generate an image feed of at least a portion of the cementitious mixture within the mixing container. The inference system includes a controller coupled to the ambient condition sensor, the temperature sensor, the moisture sensor, and the image capturing device. The controller is configured to receive the sensed ambient conditions. The controller is configured to receive the temperature signal. The controller is configured to receive the moisture content signal. The controller is configured to receive the image feed of the portion of the cementitious mixture. The controller is configured to receive signals indicative of a motor speed and a motor torque associated with the mixing container. The controller is configured to build a model and determine a material suitability of the cementitious mixture using the model based on the received ambient conditions, the temperature signal, the moisture content signal, the image feed, the motor speed, and the motor torque. The controller is configured to determine one or more corrective actions based on the determined material suitability.

Other features and aspects of this disclosure will be apparent from the following description and the accompanying drawings.

DETAILED DESCRIPTION

Figure 1:
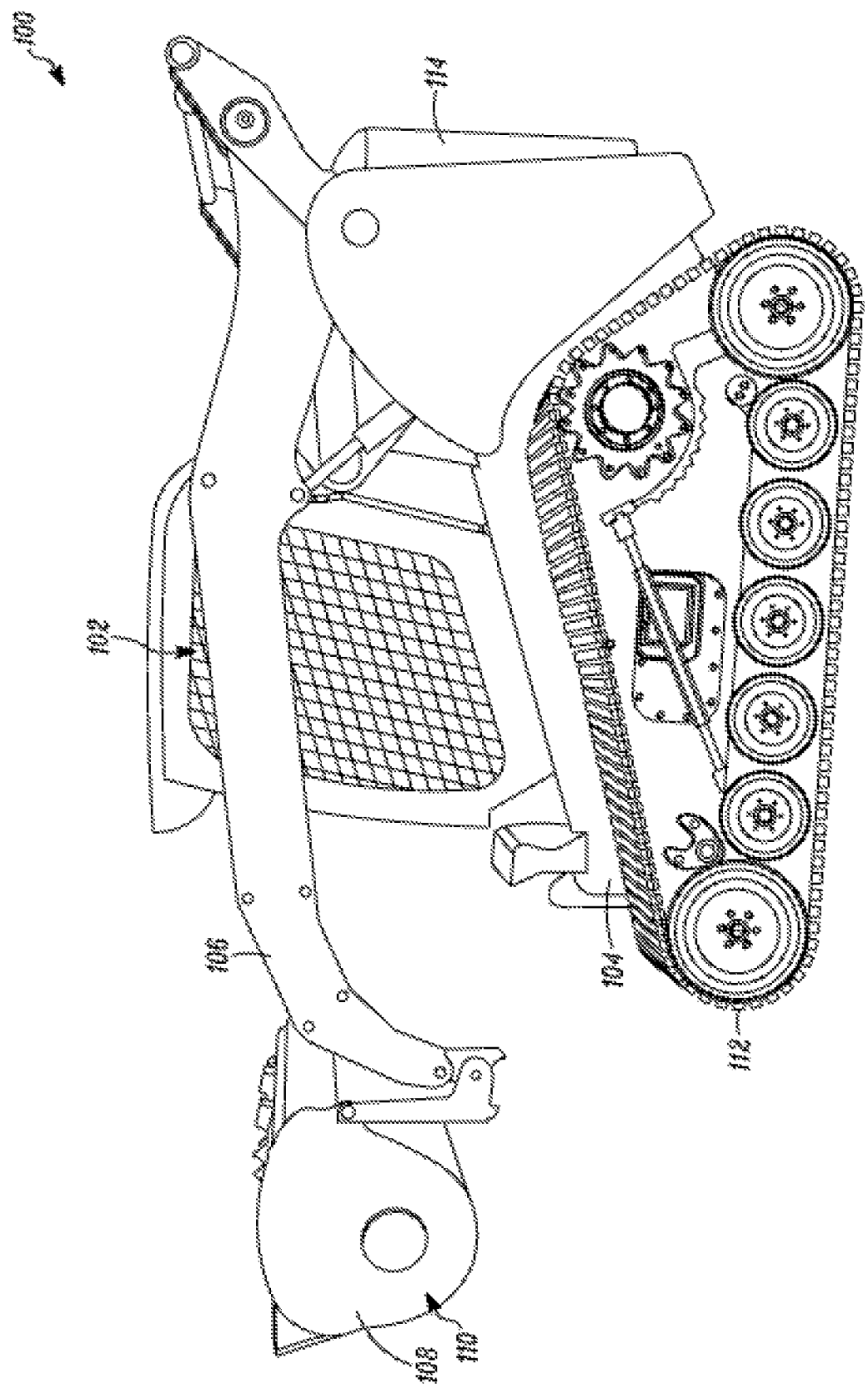
FIG. 1 is a perspective view of an exemplary machine having a mixing container, in accordance with the concepts of the present disclosure.

The present disclosure relates to a scoop and mix system for three-dimensional additive manufacturing of objects using a cementitious mixture. Referring to FIG. 1, the scoop and mix system includes an exemplary machine 100. The machine 100 is embodied as a skid steer loader. Alternatively, any other known set-up having a mixing container that is suitable for the preparation of the cementitious mixture for additive manufacturing may be utilized without deviating from the scope of the present disclosure.

The machine 100 includes an operator cab 102 supported on a frame 104 of the machine 100. A pair of lift arms 106 are pivotably attached to the frame 104 and extend longitudinally on both sides of the operator cab 102. The lift arms 106 attach at pivot points behind the operator cab 102 of the machine 100 and supports a bucket 108. In the present disclosure, the bucket 108 acts as the mixing container 110 in which different components, such as sand, aggregate, cement, water, and other additives, are introduced for forming the cementitious mixture.

The machine 100 is propelled by tracks 112. The machine 10 also includes a rear mounted engine compartment 114 supported on the frame 104. The operator cab 102 of the machine 100 houses controls for controlling a movement of the machine 100 on ground. The machine 100 also includes other components that are not described here to maintain simplicity and ease of understanding.

Figure 2:
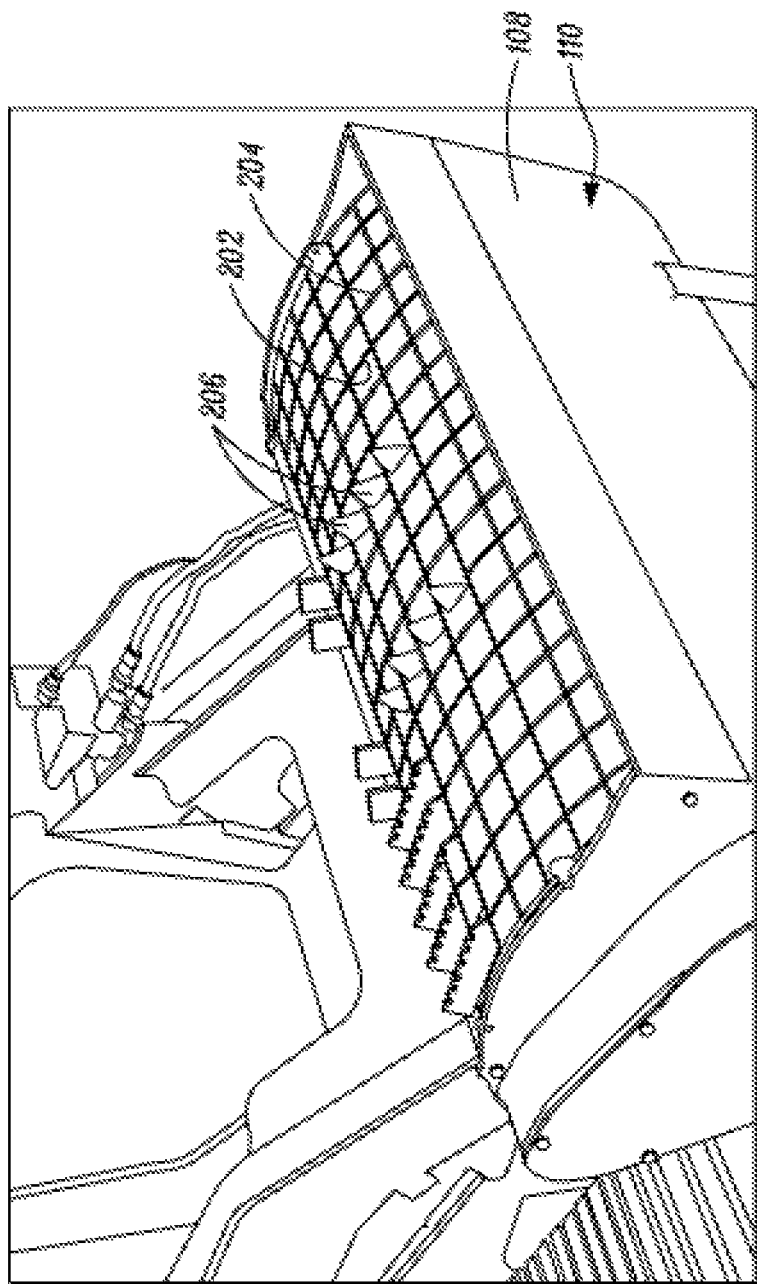
FIG. 2 is a perspective view of the mixing container, in accordance with the concepts of the present disclosure.

Referring to FIG. 2, an enlarged view of the bucket 108, hereinafter referred to as the mixing container 110 is illustrated. The depth and dimensions of the mixing container 110 are such that the ingredients, raw materials or components for making the cement mixture can be received into the mixing container 110. During operation, an operator may manually introduce a variety of the components into an opening 202 of the mixing container 110. In other embodiments, an automated system may introduce the components used to form the cement mixture into the mixing container 110 with little or no human intervention.

The mixing container 110 includes a protective grate 204 at the opening 202 of the mixing container 110. The grate 204 may also include teeth 206 for breaking the components into smaller pieces and/or for ripping open bags of the components. A hydraulically driven impeller (not shown) is connected to an auger (not shown) present within the bucket 108. The operator seated in the operator cab 102 may use the controls provided within the operator cab 102 to operate an auxiliary pump 310 (see FIG. 3) associated with the impeller. During a mixing operation, the pump 310 may thus drive the impeller, causing the components present in the mixing container 110 to be mixed for forming the cementitious mixture. A person of ordinary skill in the art will appreciate that although the present disclosure describes the scoop and mix system for forming the cementitious mixture, any other known system may also be utilized. After the mixing operation is complete, the cementitious mixture is made to exit the bucket 108 through a door (not shown) and is introduced to a cementitious mixture delivery pump (not shown).

The present disclosure relates to an inference system 300 (see FIG. 3) for real-time monitoring of the cementitious mixture being formed within the mixing container 110. In one example, the cementitious mixture may be a concrete mixture. The inference system 300 is an automated and intelligent system for monitoring a material suitability of the cementitious mixture as it is being mixed and formed. The material suitability includes predefined material properties of the cementitious mixture including stiffness, flowability, shear strength, cohesion, and slump of the cementitious mixture to ensure that the cementitious mixture being formed is consistent with the constrained requirements for three-dimensional printing applications and is five from material variations.

More particularly, the inference system 300 estimates the material properties and suitability of the cementitious mixture being mixed within the mixing container 110 and may even provide suggestive corrective actions to overcome deficiencies that may be estimated by the system. The components and working of the inference system 300 will now be described in detail.

Figure 3:
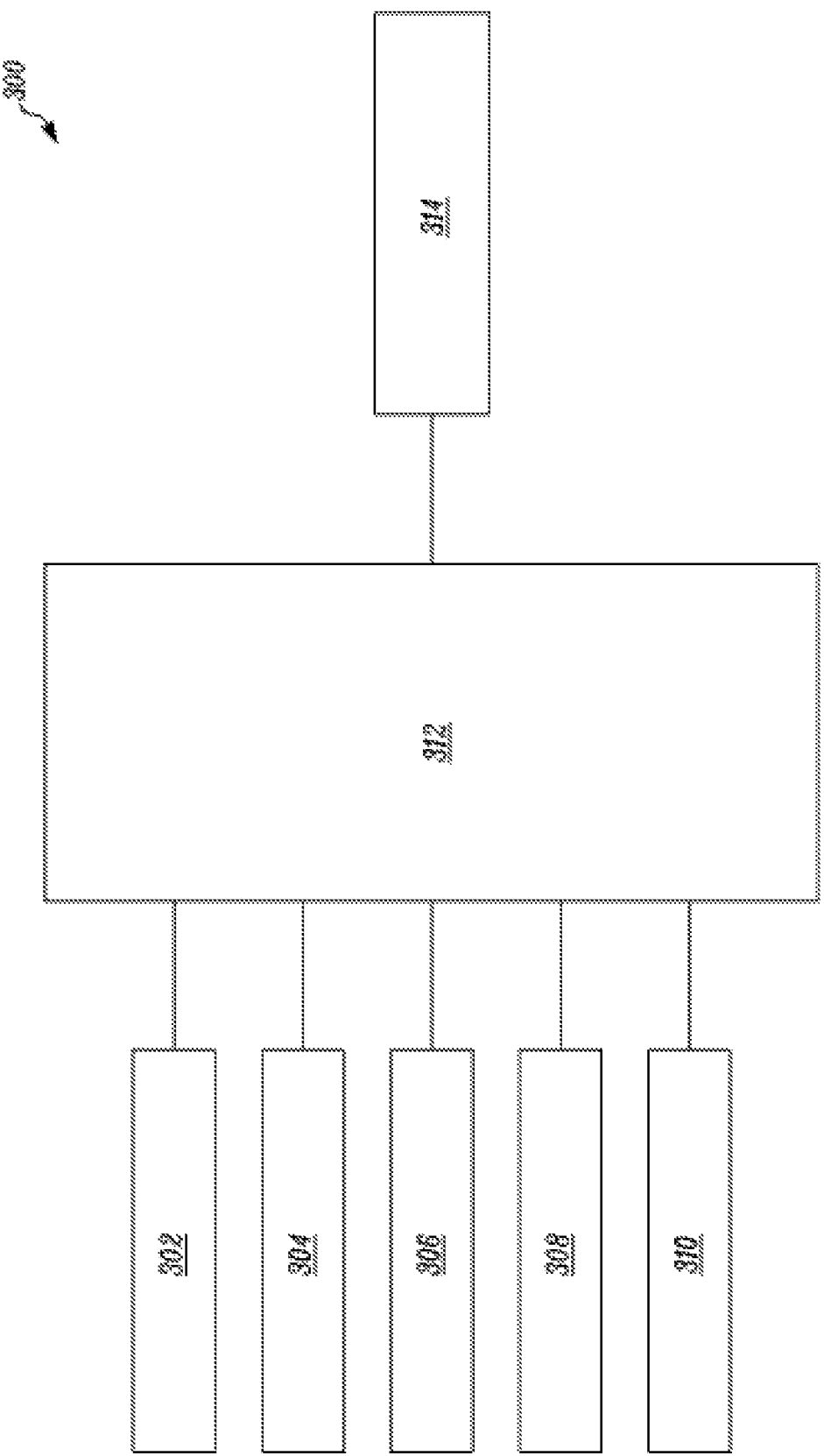
FIG. 3 is a block diagram of an inference system associated with the mixing container, in accordance with the concepts of the present disclosure.

Referring to FIG. 3, the inference system 300 includes an ambient condition sensor 302. The ambient condition sensor 302 may be mounted at any suitable location on the machine 100. The ambient condition sensor 302 is configured to sense ambient conditions associated with the mixing container 110. More specifically, the ambient condition sensor 302 provides signals indicative of ambient temperature and humidity levels in an area surrounding the mixing container 110.

The inference system 300 also includes a number of sensors mounted within or at the opening 202 of the mixing container 110 for measuring different parameters of the cementitious mixture. The inference system 300 includes a temperature sensor 304 and a moisture content sensor 306. The temperature sensor 304 and the moisture content sensor 306 may be surface mounted sensors within the mixing container 110, such that the temperature sensor 304 and the moisture content sensor 306 may come in contact with the cementitious mixture as it is being mixed within the mixing container 110. The temperature sensor 304 is configured to generate a temperature signal indicative of a temperature of the cementitious mixture. The moisture content sensor 306 is configured to generate a moisture content signal indicative of a moisture content of the cementitious mixture. It should be noted that the temperature and moisture content sensors 304, 306 may monitor and provide real-time data of respective parameters of the cementitious mixture as the mixture is being mixed within the mixing container 110.

The inference system 300 further includes an image capturing device 308. The image capturing device 308 includes a camera, a camcorder, or any other known image or video capturing device. The image capturing device 308 is mounted on the frame of the machine 100 and is positioned and directed to capture an image feed of at least a portion of the cementitious mixture. That is, the image capturing device 308 is oriented to face the opening 202 of the mixing container 110, so that the image capturing device 308 is directed towards an inner portion of the mixing container 110 and the cementitious mixture being mixed falls within a field of view of the image capturing device 308. Accordingly, the image capturing device 308 captures the image feed of the cementitious mixture as the mixture is being mixed within the mixing container 110. More particularly, the image feed provided by the image capturing device 308 may be used by the inference system 300 to estimate and measure a variety of parameters of the cementitious mixture including for example, flowability and moisture content of the cementitious mixture, and will be explained in detail later in this section.

The inference system 300 also includes sensors associated with the auxiliary pump 310 associated with the mixing container 110. For example, the inference system 300 is configured to measure a supply side pressure to the pump 310. Since a volumetric displacement of the pump 310 is known, the system is configured to determine a motor torque output. Further, the system may include a Hall effect sensor associated with the impeller. This may be used by the system to determine the motor speed. A person of ordinary skill in the art will appreciate that other known methods may be used to determine the motor torque and the motor speed of the system without deviating from the scope of the present disclosure, for example, this data may be received from a small paddle wheel in a situation when speed or torque of the impeller cannot be directly measured.

A controller 312 is coupled to the ambient condition sensor 302, the temperature sensor 304, the moisture content sensor 306, and the pump 310. The controller 312 is configured to receive the sensed ambient conditions from the ambient condition sensor 302. More particularly, the controller 312 receives the ambient temperature data and the humidity data from the ambient condition sensor 302. The controller 312 also receives the temperature signal from the temperature sensor 304 indicative of the temperature of the cementitious mixture. The controller 312 receives the moisture content signal from the moisture content sensor 306 indicative of the moisture content of the cementitious mixture. The controller 312 further receives the image feed of the cementitious mixture from the image capturing device 308.

The controller 312 performs image analysis on the image feed received from the image capturing device 308. The controller 312 may utilize known computer vision and object detection algorithms on multiple frames of the image feed to estimate in time how the cementitious mixture shifts and distorts around the impeller within the mixing container 110. Accordingly, the controller 312 may estimate the flowability of the cementitious mixture. Further, the controller 312 may analyze the moisture content, the color, the texture and other visual information obtained from the image feed. For example, if the color of the cementitious mixture is relatively dark, the controller 312 may estimate that the moisture content of the cementitious mixture is high.

Also, the controller 312 receives the data related to the motor torque and the motor speed of the pump 310. This may be used by the controller 312 to estimate a shear resistance of the cementitious mixture. Based on the received data, that is, the sensed ambient conditions, the temperature and the moisture content of the cementitious mixture, the image feed, the motor torque and the motor speed, the controller 312 builds a model and determines the material suitability of the cementitious mixture using the model. Further, the controller 312 may determine any deficiencies that exist in the material suitability and suggest one or more corrective actions to be performed by the operator to overcome the deficiencies so that the material properties of the cementitious mixture may be corrected as desired. For example, if the ambient temperature conditions are too hot or dry, the moisture content of the cementitious mixture may be affected requiring suitable corrective actions to be taken.

A predictive regression or classification model implemented by the controller 312 may be used to determine the material suitability of the cementitious mixture. The regression model may infer material properties such as shear strength, material cohesion, viscosity, etc. and compare these with respective acceptable material property ranges to see if the material properties of the cementitious mixture lies within this defined region of suitability. Alternatively, the classification model may simply predict whether the cementitious mixture is suitable or non-suitable (for example, a binary classifier). A person of ordinary skill in the art will appreciate that either of these models may be built using sufficient training data and an appropriate algorithm chosen by one skilled in the art, such as, but not limited to, random forest, kernel estimate, and recurrent neural network.

It should be noted that if image/video inputs are used in the predictive model, then the system is likely to use a deep neural network, such as the convolutional network, to deal with the high-dimensionality of the images/videos. An advanced algorithm which combines various neural network architectures (RNNs, CNNs, MLPs, etc.) could also be implemented with no loss of generality. In the present disclosure, the term "building the mode" means getting enough recorded training data to represent the variable distribution of inputs relative to a measured, ground truth set of material properties of the cementitious mixture. This data is then run through the algorithm which will learn the model parameters necessary to predict the material properties accurately on the held-out data. This process is known in the art as predictive model training and inference and is well known in the field of artificial intelligence, machine learning, and deep learning in order of increased specificity.

In this case, the controller 312 includes a general deep neural network that estimates a consensus of all the parameters that are measured by the system in the final estimation of the material properties of the cementitious mixture and identifies any deficiencies that may exist. The deep neural network may be a convolutional or recurrent neural network. A person of ordinary skill in the art will appreciate that deep neural networks can model complex non-linear relationships.

The deep neural network architectures generate compositional models where the material suitability of the cementitious mixture is expressed as a layered composition of primitives based on the input parameters, for example, the ambient conditions, the temperature and moisture content of the cementitious mixture, the motor torque and speed, and the images of the cementitious mixture. The system has a logic based rule set for evaluating the material suitability of the cementitious mixture through regression. The deep neural network includes a large network of weights and biases associated with the input parameters, like that in an empirical formula relating the inputs, such that these inputs converge to allow the controller 312 to approximate the material suitability of the cementitious mixture. Initially the system may accept a ground truth in which the material properties of the cementitious mixture is tested using traditional or known Rheology testing methods so that the system may regress onto the given parameters.

By iterative training of the system, the ground truth may be eliminated in later stages of development, and the system may provide real-time material estimation of the material suitability of the cementitious mixture as it is being mixed in the mixing container 110. The controller 312 accepts multimodal data that are of different types, including visual data, temperature data, torque and speed data, and ambient condition data. Accordingly, a suitable deep neural network may be selected. For example, a branched deep neural network having several fully connected convolution layers to process temperature data, and the motor torque and speed data may be utilized. Further, other temporal data may be processed through recurrent layers such that the output loops back to the long short-term memory (LSTM) to maintain the memory of states.

The controller 312 determines the material suitability of the cementitious mixture in real-time based on the input parameters. A person of ordinary skill in the art will appreciate that the material requirements are constrained for cementitious mixtures used in additive manufacturing. Hence, if the material suitability determined by the system is not as expected, the controller 312 may additionally or optionally provide one or more corrective actions through which the operator may restore the material suitability of the cementitious mixture within acceptable limits. The controller 312 provides guidance on how to improve deficient mix conditions based on the evaluation of the material suitability of the cementitious mixture. The controller 312 identifies deficiencies in one or more of the input parameters and intelligently provides corrective actions to change the material suitability of the cementitious mixture. For example, if the controller 312 evaluates that the cementitious mixture is too wet, the controller 312 may appropriately suggest one or more corrective actions, such as, adding a dry component, for example sand, to the cementitious mixture and/or waiting for some time to elapse before proceeding with further mixing of the cementitious mixture.

The controller 312 is also coupled to a display unit 314. The display unit 314 may include a monitor, a screen, a touchscreen, or any other visual and/or auditory output unit. In one example, the display unit 314 is positioned at such a location that the operator who introduces the components into the mixing container 110 may easily view the display unit 314. The controller 312 may notify the operator of the determined material suitability of the cementitious mixture to the operator via the display unit 314. Further, the controller 312 may also notify the operator of the one or more corrective actions, if required, through the display unit 314. Based on the requirements, other interim results that are monitored or evaluated by the controller 312 may also be displayed to the operator through the display unit 314.

As described earlier, the controller 312 monitors and computes the material suitability of the cementitious mixture in real-time from a start of the mixing operation until the cementitious mixture is prepared and/or corrected. The controller 312 may be located at any suitable location either on or off-board the machine 100. The cementitious mixture described herein may be used to create any suitable structural object. Once the cementitious mixture is prepared in the bucket 108, the cementitious mixture is transferred to the cementitious delivery pump In other examples, the present disclosure is also applicable to a hopper associated with a pumping system that is connected to an extrusion nozzle. It should be noted that once the cementitious mixture is deposited from a mixing system into the pumping system, the cementitious mixture may still need to be monitored so that deficiencies in the material properties may be restored. In some cases, the working of the controller 312 may be a factor in the system coordinating a balance between pump flow and linear rate of the extrusion nozzle.

INDUSTRIAL APPLICABILITY

Figure 4:
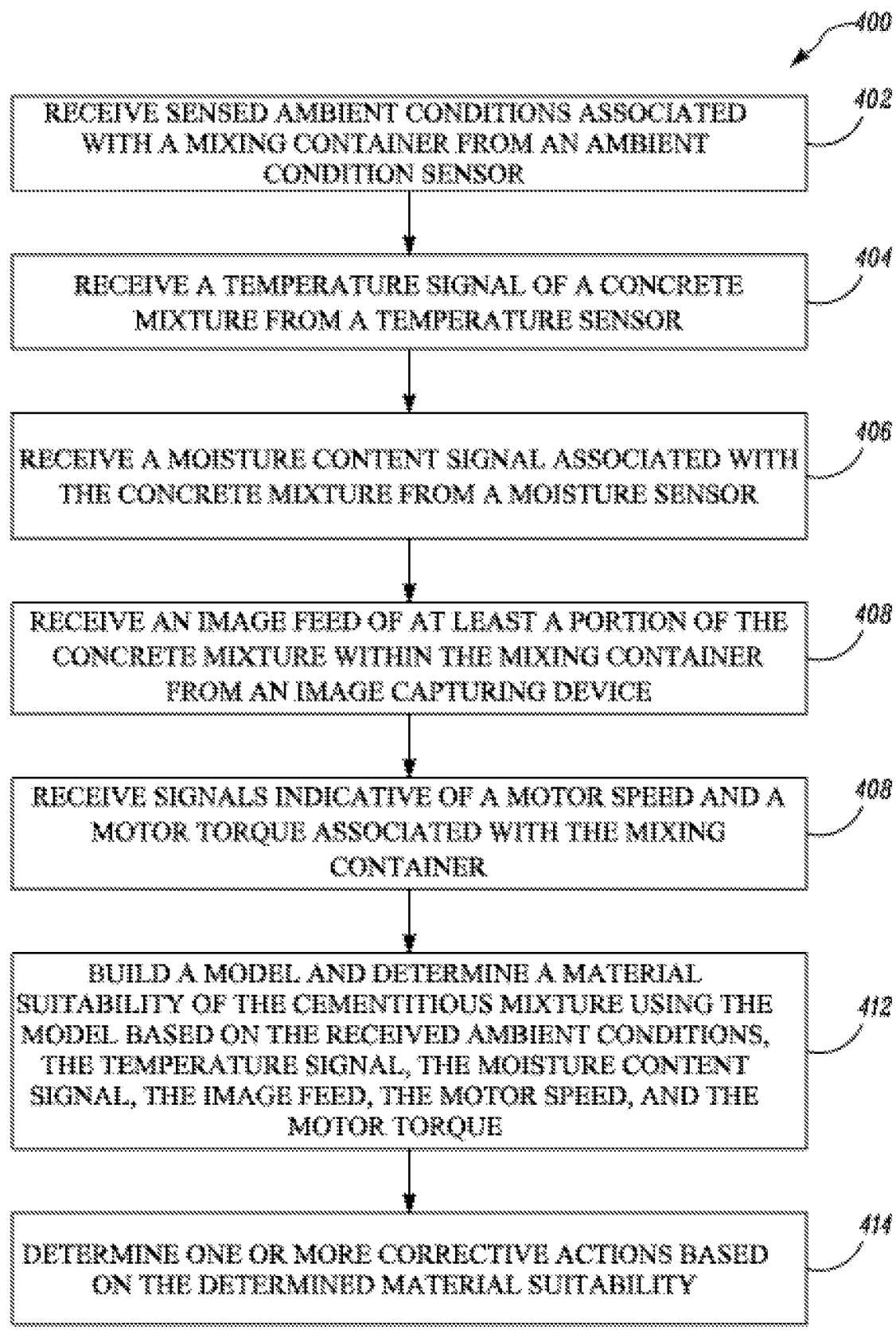
FIG. 4 is a flowchart of a method for monitoring a cementitious mixture for three-dimensional printing, in accordance with the concepts of the present disclosure.

The present disclosure relates to the system 300 and method 400 for inferring and estimating material suitability of the cementitious mixture used in fused deposition modelling or additive manufacturing. Referring to FIG. 4, at step 402, the controller 312 receives the sensed ambient conditions associated with the mixing container 110 from the ambient condition sensor 302. At step 404, the controller 312 receives the temperature signal of the cementitious mixture from the temperature sensor 304. At step 406, the controller 312 receives the moisture content signal associated with the cementitious mixture from the moisture content sensor 306.

At step 408, the controller 312 receives the image feed of at least the portion of the cementitious mixture within the mixing container 110 from the image capturing device 308. At step 410, the controller 312 receives the signals indicative of the motor speed and the motor torque associated with the mixing container 110. At step 412, the controller 312 builds a model and determines the material suitability of the cementitious mixture using the model based on the received ambient conditions, the temperature signal, the moisture content signal, the image feed, the motor speed, and the motor torque. At step 414, the controller 312 determines one or more corrective actions based on the determined material suitability.

The system of the present disclosure provides a robust solution for effectively and dynamically evaluating the material suitability of the cementitious mixture and suggesting corrective actions to improve the material suitability, if required. The system makes use of inputs from a robust sensor suite associated with the mixing container 110 that can easily be deployed. The system reduces reliance on expertise of the operator who is performing the mixing operation, and provides an accurate estimation of the material properties through real-time evaluation. Good material suitability of the cementitious mixture may yield good material deposition, improving structural stability of any object formed using this cementitious mixture.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for monitoring a cementitious mixture for three-dimensional printing, the method comprising:
   receiving, by a controller, an ambient conditions associated with a mixing container from an ambient condition sensor;
   receiving, by the controller, a temperature signal of the cementitious mixture from a temperature sensor;
   receiving, by the controller, a moisture content signal associated with the cementitious mixture from a moisture sensor;
   receiving, by the controller and from a camera directed toward an inner portion of the mixing container, an image feed, wherein the camera is configured to capture the image feed of at least a portion of the cementitious mixture within the mixing container, to determine a material suitability of the cementitious mixture;
   receiving, by the controller, signals indicative of a motor speed and a motor torque associated with the mixing container;
   executing a model by the controller, the model configured to receive as inputs the ambient conditions, the temperature signal, the moisture content signal, the image feed, the motor speed, and the motor torque;
   determining, by the controller, a material suitability of the cementitious mixture, based at least in part on an output of the model; and
   determining and outputting, by the controller, one or more corrective actions based at least in part on the material suitability of the cementitious mixture.

2. The method of claim 1, wherein outputting the corrective actions comprises providing, by the controller, a notification of the one or more corrective actions through a display unit.

3. The method of claim 1, further comprising determining, by the controller, a color of the cementitious mixture based at least in part on the image feed.

4. The method of claim 1, further comprising determining, by the controller, a texture of the cementitious mixture.

5. The method of claim 1, further comprising:
   determining, by the controller, a start of a mixing operation by the mixing container; and
   initiating real-time monitoring, by the controller, of the ambient conditions, the temperature signal, the moisture content signal, the image feed, the motor speed, and the motor torque, based on the start of the mixing operation.

6. The method of claim 1, wherein receiving the ambient condition includes:
   receiving ambient temperature data of an area surrounding the mixing container; and
   receiving humidity data of the area surrounding the mixing container.

7. The method of claim 1, wherein determining the material suitability of the cementitious mixture comprises:
   receiving, as an output from model, at least one inferred material property of the cementitious mixture; and
   comparing the at least one inferred material property to at least one range of suitable values associated with the at least one inferred material property.

8. The method of claim 7, wherein the at least one inferred material property includes at least one of:
   shear strength;
   stiffness;
   flowability;
   slump;
   material cohesion; or
   viscosity.

9. The method of claim 1, wherein the model includes at least one of:
   a regression model; or
   a classification model.

10. A system comprising a controller, the system configured to perform operations comprising:
   receiving, by the controller, an ambient condition associated with a mixing container from an ambient condition sensor;
   receiving, by the controller, a temperature signal associated with a cementitious mixture from a temperature sensor;
   receiving, by the controller, a moisture content signal associated with the cementitious mixture from a moisture sensor;
   receiving, by the controller and from a camera directed toward an inner portion of the mixing container, an image feed, wherein the camera is configured to capture the image feed of at least a portion of the cementitious mixture within the mixing container, to determine a material suitability of the cementitious mixture;
   receiving, by the controller, signals indicative of a motor speed and a motor torque associated with the mixing container;
   executing a model by the controller, the model configured to receive as inputs the ambient condition, the temperature signal, the moisture content signal, the image feed, the motor speed, and the motor torque;
   determining, by the controller, a material suitability of the cementitious mixture, based at least in part on an output of the model; and
   determining and outputting, by the controller, one or more corrective actions based at least in part on the material suitability of the cementitious mixture.

11. The system of claim 10, wherein outputting the corrective actions comprises providing, by the controller, a notification of the one or more corrective actions through a display unit.

12. The system of claim 10, the operations further comprising determining, by the controller, a color of the cementitious mixture based at least in part on the image feed.

13. The system of claim 10, the operations further comprising determining, by the controller, a texture of the cementitious mixture.

14. The system of claim 10, the operations further comprising:
   determining, by the controller, a start of a mixing operation by the mixing container; and
   initiating real-time monitoring, by the controller, of the ambient conditions, the temperature signal, the moisture content signal, the image feed, the motor speed, and the motor torque, based on the start of the mixing operation.

15. The system of claim 10, wherein receiving the ambient conditions includes:
   receiving ambient temperature data of an area surrounding the mixing container; and
   receiving humidity data of the area surrounding the mixing container.

16. The system of claim 10, wherein determining the material suitability of the cementitious mixture comprises:
   receiving, as an output from model, at least one inferred material property of the cementitious mixture; and
   comparing the at least one inferred material property to at least one range of suitable values associated with the at least one inferred material property.

17. The system of claim 16, wherein the at least one inferred material property includes at least one of:
shear strength;
stiffness;
flowability;
slump;
material cohesion; or
viscosity.

18. The system of claim 10, wherein the model includes at least one of:
a regression model; or
a classification model.

* * * * *